W. WRIGHT.
COMBINED TYPEWRITING AND COMPUTING MACHINE.
APPLICATION FILED JULY 14, 1917.

1,349,246.

Patented Aug. 10, 1920.
3 SHEETS—SHEET 1.

Witnesses:

Inventor:
Walter Wright
by B. C. Stickney
Attorney

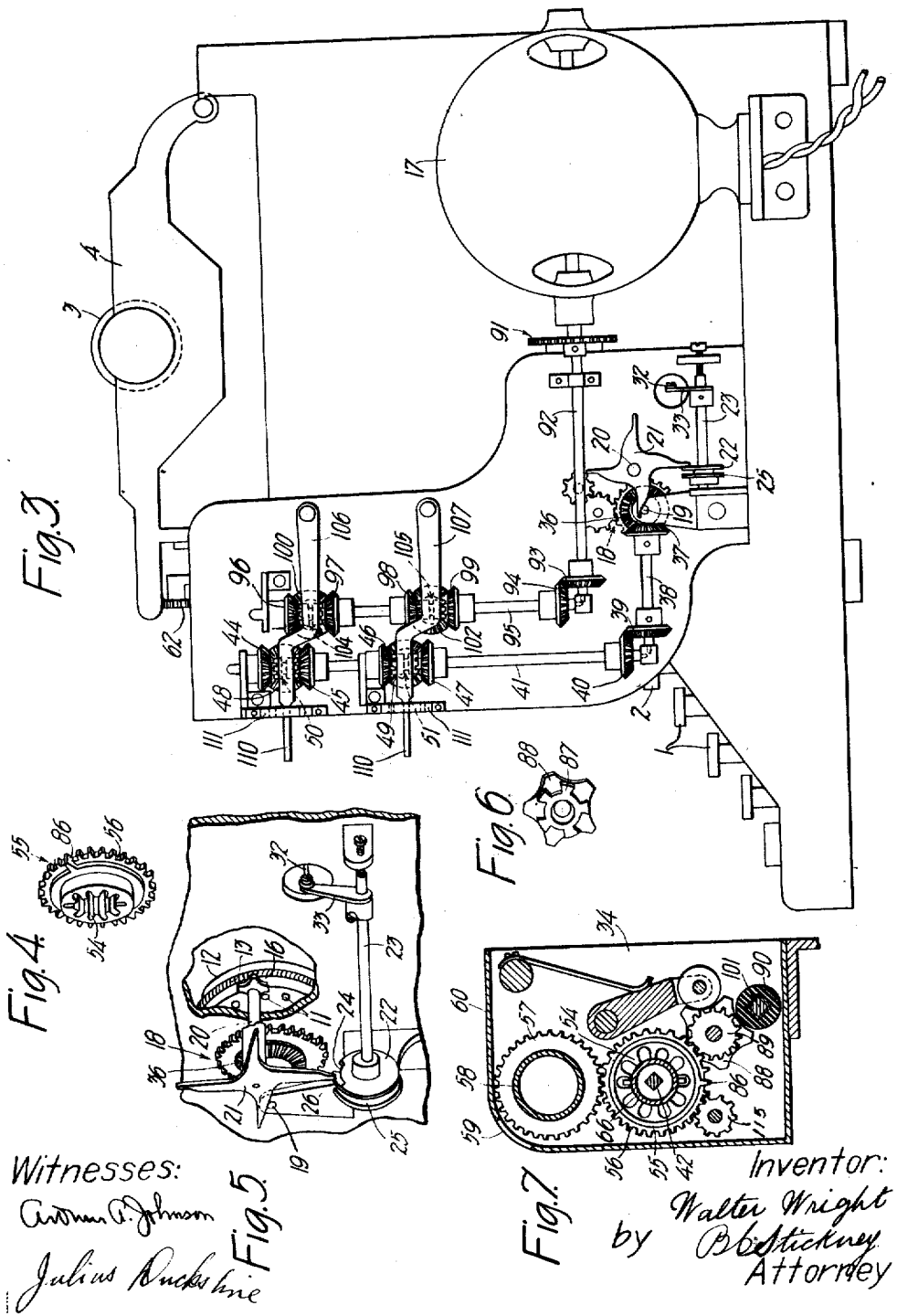

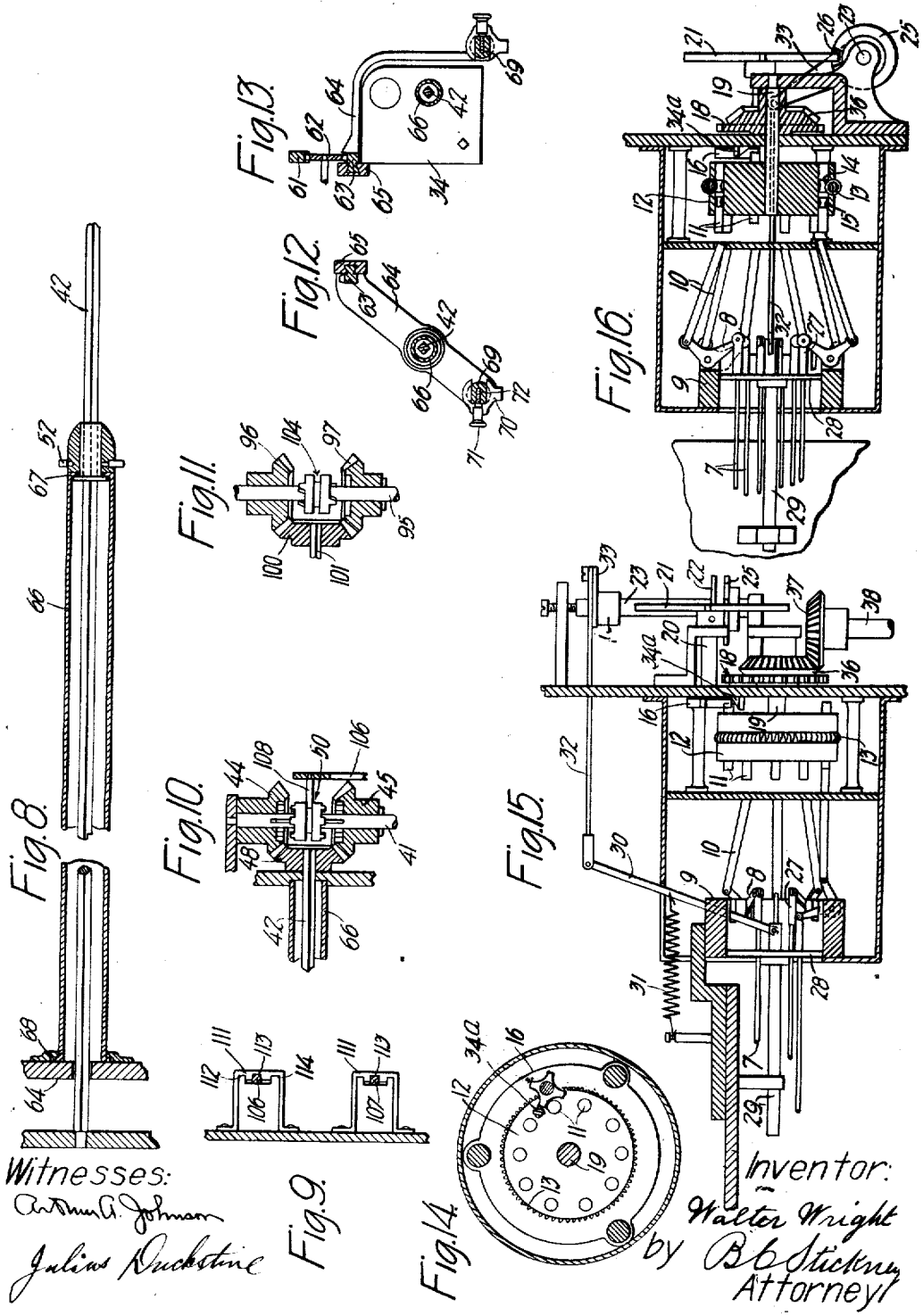
W. WRIGHT.
COMBINED TYPEWRITING AND COMPUTING MACHINE.
APPLICATION FILED JULY 14, 1917.
1,349,246.
Patented Aug. 10, 1920.
3 SHEETS—SHEET 3.

UNITED STATES PATENT OFFICE.

WALTER WRIGHT, OF NEW YORK, N. Y., ASSIGNOR, BY MESNE ASSIGNMENTS, TO UNDERWOOD COMPUTING MACHINE COMPANY, A CORPORATION OF NEW YORK.

COMBINED TYPEWRITING AND COMPUTING MACHINE.

1,349,246.  Specification of Letters Patent.  Patented Aug. 10, 1920.

Original application filed April 20, 1908, Serial No. 428,020. Divided and this application filed July 14, 1917. Serial No. 180,508.

*To all whom it may concern:*

Be it known that I, WALTER WRIGHT, a citizen of the United States, residing in New York, in the county of New York and State of New York, have invented certain new and useful Improvements in Combined Typewriting and Computing Machines, of which the following is a specification.

This invention relates to an improvement in combined typewriting and computing machines of the Wright type, and is a division of my application 428,020, filed April 20, 1908, covering the modification disclosed in Figure 34 of said application.

The present case deals with the concomitant typewriting and computing of a series of columns of numbers, so as to obtain the totals of the individual vertical columns, the cross totals of the horizontal columns and the gross total of all the numbers. A long totalizer is provided including a series of computing wheels, which may be grouped to form small totalizers capable of adding vertical columns. This long totalizer is stationary, and the master wheel therefor is traversed step by step from the typewriter carriage by a pair of oppositely moving parallel racks connected by an intermediate gear. A short totalizer is used as the cross totalizer and also as the gross totalizer. This short totalizer is also stationary, and the master wheel therefor travels step by step in synchronism with the master wheel for the long totalizer. The short totalizer master wheel, however, has to return to register with the highest computing wheel for each new column of figures, so that instead of traveling continually for the line of computing, as is the case of the long totalizer master wheel, it vibrates back and forth. The movement of the short totalizer master wheel is controlled from the traveling carriage of the long totalizer master wheel, which is provided with a series of pick-up lugs adjusted at various points according to the particular groups of computing wheels in the long totalizer with which it is desired to have the computing wheels of the short totalizer work in synchronism. These pick-up lugs or stops catch upon a hook connected to the carriage of the short totalizer master wheel, and carry the short-totalizer master-wheel along with the long-totalizer master-wheel, until the units computing wheel in the short totalizer has been brought in register with the master wheel. Then the hook is tripped by a disengaging stop, so that the short-totalizer master-wheel returns to register with the computing wheel of highest denomination. Each of the pick-up lugs or stops on the long-totalizer master-wheel carriage acts in succession to carry the short totalizer master-wheel along with it until the limit of the short totalizer is reached. Then this master wheel is dropped, allowing it to jump back to its starting position, ready for coördination with the next group of computing wheels of the long totalizer, as determined by the next pick-up lug.

The master wheels are driven, in the manner more particularly described in the parent case, from a motor under the control of an escapement or indexing mechanism, the latter controlled by the numeral keys as they are depressed to print the digits computed. This escapement or indexing mechanism is of the type which valuates the computing action according to the value of the numeral key actuated at the time. Thus, graded computing movements are carried immediately into the computing wheels of the totalizers. Provision is made between the indexing or escapement mechanism and the totalizers to vary the direction of rotation, so that one totalizer may add while the other may subtract. Provision is also made for silencing either totalizer so that one may be active while the other is neutral.

Other features and advantages will hereinafter appear.

In the accompanying drawings,

Fig. 1 is a front view in elevation, with parts omitted to simplify the showing, and illustrates the master wheel for the long totalizer about one wheel beyond its starting position at the beginning of the travel of the typewriter carriage. The master wheel for the short totalizer is picked up by the long-totalizer master-wheel carriage and is in a corresponding position in register with the second highest computing wheel of the short totalizer.

Fig. 3 is a detail side view in elevation, with the cover plate of the gearing removed so as to show the trains of gearing from the motor and the escapement mechanism to the master wheel and tens-carrying shafts.

Fig. 4 is a detail perspective view of one of the computing wheels, showing a tens-carrying tooth and also the internal and external gears, whereby the computing wheel is driven and drives the dial wheel.

Fig. 5 is a detail perspective view of the escapement or indexing mechanism, showing the same in its initial position before a numeral key has been struck.

Fig. 6 is a detail perspective view of one of the tens-carrying wheels.

Fig. 7 is a vertical section taken through one of the totalizers, illustrating how the master wheel drives a computing wheel, and also illustrating how the tens-carrying mechanism is arranged in connection with the computing wheels.

Fig. 8 is a vertical section through the sleeve of the master wheel for the long totalizer.

Fig. 9 is a vertical section taken from right to left through the detent mechanism for the shifting levers which determine the drive and the direction of drive of the master wheel and tens-carrying shafts.

Fig. 10 is a vertical section through the reversing gearing which drives the master wheel shaft for the long totalizer.

Fig. 11 is a vertical section through the reversing gear for one of the carry-over shafts.

Fig. 12 is a detail vertical section taken from front to rear and looking from right to left, through the master wheel carriage for the long totalizer.

Fig. 13 is a vertical section taken from front to rear and looking from left to right, through the master wheel carriage for the long totalizer, and showing the left end of the long totalizer.

Fig. 14 is a detail vertical section taken from front to rear, showing the escapement or indexing mechanism whereby the master wheels are driven amounts corresponding to the values of the numeral keys actuated.

Fig. 15 is a detail top plan view of the escapement or indexing mechanism, partly in section to show the underlying structure. This view illustrates one of the jacks as operated by the depression of its associated numeral key to project an indexing pin to its computation determining position.

Fig. 16 is a vertical section through the mechanism illustrated in Fig. 15, with all of the jacks, however, in their actuated positions.

Figures 1, 2:
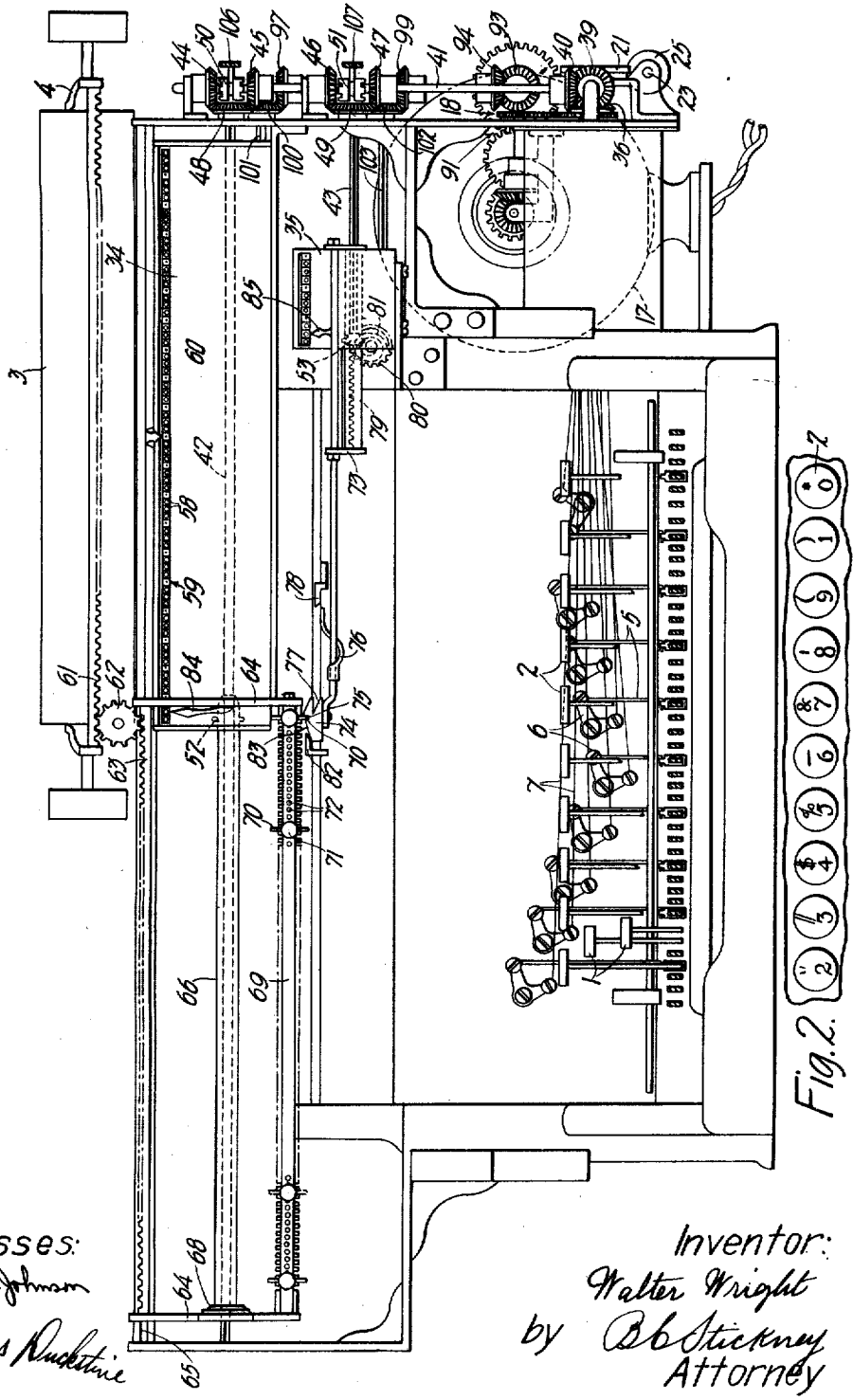
Fig. 2 is a detail top plan view, illustrating the fact that the numeral keys can be used for writing signs in upper-case as well as the digits in lower-case.

Alphabet keys 1 and numeral keys 2 are depressed, to print through the intermediary of type actions (not shown), causing types to print upon a work-sheet on the platen 3, carried by a carriage 4. The carriage 4 has the usual step-by-step movement.

The numeral keys 2, in addition to typewriting, control computing operations. For this purpose, each of the numeral keys is connected to a hook 5, and when depressed draws down on this hook to rock a bell crank 6, which, in turn, draws on a link 7. The link 7 is connected to rock a bell crank 8, Fig. 15, pivotally mounted on a spider 9. The bell crank 8 thrusts forward a plunger or jack 10, so as to set the apposite one of a series of pins 11, adjustably mounted on a pin-wheel 12. There is a series of the plungers or jacks 10, one for each numeral key, and they correspond in their positions in the circle in which they are arranged to the values of the associated numeral keys.

The pin-wheel 12 forms an escapement or indexing wheel, which determines the extents of computations to correspond with the particular numeral keys operated. For this purpose, normally, all of them, but one, project toward the plungers or jacks 10 and are held in such positions by means of a circular spring 13, which may engage alternately in a pair of grooves 14 and 15 provided in the pins 11. One of the pins 11 is normally held with its right-hand end (Fig. 16) projected and engaging a stop-wheel 16, Fig. 5. This stop-wheel prevents the rotation of pin-wheel 12 in the manner to be presently described, until a numeral key is actuated.

The pin-wheel 12 is normally under a driving tendency to rotate from a motor 17, Fig. 3. The motor 17 is connected in the manner more particularly described in the parent case by a train of gearing 18 to a shaft 19, to which the pin-wheel 12 is secured. This train of gearing includes a slip clutch (not shown), which, so long as the pin-wheel 12 is held by the stop-wheel 16, will permit the motor to run idly without driving the pin-wheel, but as soon as the pin-wheel is released by rotation of the stop-wheel 16, then the motor will drive the shaft 19 and the computing mechanism controlled by the shaft and by the pin-wheel.

The stop-wheel 16 is normally held against rotation until a numeral key is actuated. For this purpose, it is secured to a shaft 20, on the other end of which is provided a star-wheel 21, one of the teeth of which is normally in engagement with a stop disk 22 on a rock shaft 23. The stop-disk 22 has an opening 24 therein, which, when the shaft 23 is rocked, will come in register with the particular tooth or arm of the star-wheel 21, which happens to be in engagement with the disk 22. This will permit the star-wheel 21 to escape until it is caught by a second stop-disk 25 located just beyond the stop-disk 22, and secured to the same rock shaft 23. The second stop-disk 25 has an opening or a passage 26 out of register with the passage or opening 24 on the first stop-disk 22, so that it will necessitate the return or backward rocking movement of the disks and shaft, to permit the tooth of the star-wheel 21, which has just escaped from the disk 22, to escape from the disk 25.

The back-and-forth rocking movement of the shaft 23 is controlled from the numeral keys at the striking of them to print and to set up one of the pins 11. For this purpose, each of the links 7 is provided with a head 27, Fig. 15, which when the associated numeral key is operated engages and operates a plate 28, universal to all of the heads 27. This plate 28 is mounted on a rod 29, guided for sliding movement, and has connected thereto a lever 30, pivoted intermediate its ends. When a numeral key sets one of the pins 11, it also operates this universal plate 28, which, in turn, swings the lever 30 against the tension of a spring 31, so as to thrust on a link 32, which is connected to an arm 33, secured to the rock shaft 23.

On the downstroke of the numeral key, one of the pins 11 is set and the shaft 23 is rocked to permit the star-wheel 21 to escape from the disk 22 to the disk 25. This permits but a slight rotation of the stop-wheel 16, not sufficient, however, to permit the previously projected pin 11 to escape therefrom. On return of the numeral key, however, the shaft 23 rocks backwardly, permitting the star-wheel 21 to escape from the second disk 25, which will rotate the stop-wheel 16 sufficiently to permit the previously set pin 11 to escape therefrom. Under these conditions, the indexing pin-wheel 12 will rotate until the just set pin comes into engagement with the stop-wheel 16, when the indexing pin-wheel 12 will be brought to a stop by the next tooth of the stop-wheel 16 which is rotated just far enough to bring the next arm of the star-wheel 21 into engagement with the first stop disk 22. The previously projected pin is returned during the rotation of the wheel 12 by a properly located cam 34ª.

The amount of rotation of the indexing pin-wheel 12 depends on the numeral key just actuated, which will set a pin 11 at a distance from the stop-wheel 16, corresponding to its value. This escapement or indexing mechanism, therefore, valuates the computing action according to the particular numeral key struck. In other words, it determines the extents which the motor 17 will drive the computing wheels of totalizers 34 and 35 step by step as the numeral keys are operated.

The connection from the indexing shaft 19 to the totalizers 34 and 35 includes a beveled gear 36 secured to the shaft 19. This beveled gear 36 meshing with a gear 37 on a shaft 38 provided with a beveled gear 39 meshing with a gear 40 to drive a vertical shaft 41. The vertical shaft 41 drives master wheel shafts 42 and 43 for the totalizers 34 and 35, respectively. A reversible gearing connection is provided between the vertical shaft 41 and each of the master wheel shafts 42 and 43, so that one master wheel shaft may be rotated to add, while the other shaft may be rotated to subtract. This connection is also arranged so that one master wheel shaft may be disconnected or silenced, while the other is actually driven. For this purpose, the shaft is provided with four beveled gears, 44, 45, 46 and 47, arranged in oppositely-facing pairs and loosely mounted on the shaft 41. One pair of gears, 44 and 45, mesh with and drive a beveled gear 48 secured to the master wheel shaft 42, while the pair of gears, 46 and 47, mesh with and drive a beveled gear 49, secured to the master wheel shaft 43. To determine which gear of each pair shall be clutched in driving relation with the shaft 41, there is provided between each pair a clutch, indicated at 50, for the totalizer 34, and at 51 for the totalizer 35. These clutches have teeth at their upper and lower ends to engage corresponding teeth provided on the inner faces on the gears 44 to 47. The clutches 50 and 51 are splined on the shaft 41, so as to rotate therewith, and can move from an intermediate neutral position, in which they are not connected with either of the beveled gears of a pair, to either one of two positions on opposite sides of this neutral position, in which they will connect one or the other of the pair of beveled gears rigidly to the shaft 41. It is thus evident that the motor 17 may drive the master wheel shafts 42 and 43 either separately or in unison and either in the same direction or the opposite directions.

The master wheel shafts 42 and 43 are squared, as illustrated in Fig. 1, so as to drive master wheels 52 and 53 for the totalizers 34 and 35, respectively. These master wheels are slidably mounted on the shafts 42 and 43, so that they can be brought step by step into register with internal gears 54, provided on computing wheels 55, Fig. 7. The computing wheels 55 are also provided with external gears 56, which mesh with gears 57 provided on dial wheels 58, having numbers inscribed on their surfaces to be exhibited through a sight-opening 59 in a totalizer casing 60.

The step-by-step movements of the master wheels are controlled from the typewriter carriage 4. For the present modification, this is done by providing on the front of the typewriter carriage, Fig. 1, a rack 61, which meshes with and drives a gear 62. The gear 62 is interposed between the rack 61 and oppositely-facing rack 63, so as to drive the latter at the same speed, but in the opposite direction. The rack 63 is provided on a master-wheel carriage 64 for the master wheel 52 of the totalizer 34. This carriage 64 is slidably mounted on ways 65, so as to have a rectilinear movement. It will thus be seen that as the typewriter carriage 4 advances step by step in a letter-feeding direction, the master-wheel carriage 64 will advance step by step to the right, Fig. 1, carrying the master wheel 52 seriatim into register with each of the computing wheels 55 and dial wheels 58, starting with the wheel of highest denomination and advancing one by one through the series of wheels to the wheel of lowest denomination. The master wheel 52 is moved with the master-wheel carriage 64 by a sleeve 66, Fig. 8, which has a circular tongue-and-groove connection 67 with the master wheel 52, and a second circular tongue-and-groove connection 68 with the carriage 64. In this way, the master wheel 52 may rotate with the shaft 42 relatively to the sleeve 66 and the master-wheel carriage 64, and yet can be moved positively lengthwise of the shaft 42 as the carriage 64 advances step by step.

At this point it may be stated that the totalizer 34 is a long totalizer and includes a long series of computing wheels, one computing wheel for each digit column desired to be computed in within the capacity of the typewriter carriage 4. These computing wheels may be computed in in groups to correspond with the grouping of the digits in major columns or computing zones as typewritten on the work-sheet carried by the typewriter carriage. This is taken care of by the proper spacing of the major columns of numbers as typewritten with the proper movement of the typewriter carriage to the several computing zones. Each of the groups of computing wheels as predetermined upon will compute vertical columns of figures, so that the long totalizer 34 will give a series of sum totals, one for each vertical column typewritten and computed.

The other totalizer 35 is a short totalizer and is adapted to cross total and also gross total. That is to say, it is adapted to sum up the numbers typewritten in horizontal columns, at the same time that these members are individually summed up by the long totalizer 34 in vertical columns. For this purpose, the master wheel 53 for the short cross totalizer 35 is made to move in synchronism with the master wheel 52 for the long totalizer 34. These movements, however, are intermittent, that is to say, the master wheel 53 will move in synchronism with the master wheel 52 for the range or capacity of the short cross totalizer 35 and for a group of the computing wheels of the long totalizer 34. Then, it will jump back and start over again in synchronism with a new group of computing wheels of the long totalizer 34.

For the purpose of vibrating the master wheel 53, it is connected intermittently to travel with the master wheel 52 and its carriage 64. On the carriage 64 there is provided a rack 69, carrying a series of teeth located at letter-space intervals, and also at computing wheel-space intervals. This rack 69 forms accurate means of adjusting pick-up stops 70 at computing wheel and letter-space intervals by inserting the stops between the teeth of the rack. The pick-up stops may be locked in their adjusted positions by set screws 71 engaging in openings 72, provided on the zone of the rack 69. The number of the pick-up stops 70 are provided according to the number of separate computing zones or columns desired, and they are located at positions corresponding to the location of the initial digit column of each major computing zone or column as typewritten on the work-sheet carried by the carriage. The pick-up stops 70 form a part of the means of connection between the long totalizer master wheel carriage 64 and a carriage 73 for the short totalizer master wheel 53.

Each of the stops come in succession into engagement with a hook 74, provided on the short totalizer master wheel carriage 73, and enters into a socket 75 provided in this hook, a spring 76 forcing the hook 74 onto the stop 70. The initial pick-up stop 70 carries the short totalizer master wheel carriage 73 along with it until the master wheel 53 has computed in the units computing wheel, when an incline or cam surface 77 comes into engagement with a disconnecting cam 78 lying in the path of travel of the hook 74. This cam 78 will cause the hook to be forced out of engagement with the initial pick-up stop 70, so as to disconnect the short totalizer master wheel carriage 73 from the long totalizer master wheel carriage 64.

During the travel of the master wheel 53 from the highest computing wheel of the short totalizer to the lowest computing wheel, a rack 79 on the short totalizer carriage 73 drives a gear 80 to wind up a spring-drum 81. Thus, when the short totalizer carriage 73 is disconnected from the long totalizer carriage 64, this spring-drum 81 unwinds to return the master wheel carriage 73 and the master wheel 53 to their starting position. In this position, the hook 74 is ready to be engaged by the next pick-up stop 70, so as to carry the master wheel 53 along in unison with the master wheel 52 for the second group of computing wheels of the long totalizer 34. The advance and return oscillation of the short totalizer master wheel 53 is repeated for the length of travel of the long totalizer master wheel 52 until all of the zones and groups of computing wheels have been computed in.

In order that the long totalizer carriage 64 may not return the short totalizer carriage 73 and the master wheel 53 beyond the registering of the master wheel 53 with the highest computing wheel on a return movement of the typewriter carriage and the carriage 64, there is provided a disconnecting cam 82, which is arranged to engage the cam surface 83, provided on the hook 74, so as to depress it against the tension of the spring 76, and thus clear the hook 74 from engagement with the particular pick-up stop 70 in register with it, and permitting all stops to the right thereof to clear themselves from the hook by depressing it, one after another, as they pass over it. The spring 76, however, holds the hook 74 up so that the first stop 70, traveling to the right, will pick up the hook 74 and carry along the master wheel 53. The positions of the master wheels 52 and 53 with respect to the computing wheels are pointed out by indicators 84 and 85.

Provision is made for carrying complete rotations of lower computing wheels and dial wheels to higher computing wheels and higher dial wheels of both totalizers. For this purpose, each of the computing wheels is provided with a carry-over tooth 86, Figs. 4 and 7. This carry-over tooth engages and operates once in a revolution a five-toothed gear 87, Fig. 6. The five-toothed gear 87 forms one element of a carry-over unit, which includes three parts, to wit, the gear 87, a five toothed star-wheel 88 and a gear 89. The gear 89 meshes with the gear 56 of the next higher computing wheel from the one which operates the gear 87 through the intermediary of the carry-over tooth 86. When the carry-over tooth 86 operates the carry-over unit, it brings one of the teeth of the star-wheel 88 within the driving range of an assisting or boosting rubber roller 90, so that the latter will complete the carry-over movement of the carry-over unit, causing the digit "1" to be carried from a lower computing wheel to the next higher computing wheel. The assisting roller 90 is driven from the motor 17 in one direction or the other, according to whether the master wheel for the associated computing wheel is rotated for addition or for subtraction.

The computing wheels 55 are normally supported and retained in place by gears 89 of the carry-over mechanism, the gears 57 of the dial wheels, and the gears 115 (see Fig. 7). As the computing wheels 55 are approached by the master-wheel 52 they are accurately centered by the tapered member just to the right or in advance of the master-wheel, as seen in Fig. 8.

Considering the drive from the motor 17 to the assisting rollers 90 for the totalizers 34 and 35, a train of gearing 91, (Figs. 1 and 3), connects the shaft of the motor 17 with a transverse shaft 92, so as to constantly rotate the latter. The shaft 92 drives, through the intermediary of a pair of gears 93 and 94, a vertical shaft 95. This vertical shaft 95 is provided with two pairs of oppositely-facing gears, one pair for each carry-over assisting roller 90. These gears are numbered 96, 97, 98 and 99. The gears 96 and 97 drive a beveled gear 100, secured to a shaft 101, on which the assisting roller 90 for the upper long totalizer 34 is mounted. The gears 98 and 99 drive a similar gear 102 for the shaft 103, on which the assisting roller 90 for the lower short totalizer 35 is mounted.

The paired gears 96 to 99 are not secured to the vertical shaft 95, but may be individually connected thereto by means of clutches 104 and 105 for the upper totalizer 34 and the lower totalizer 35, respectively. These clutches are provided with teeth on their upper and lower ends, and may be shifted from an intermediate neutral position, in which they connect neither of the paired beveled gears to the shaft 95, to alternative positions, in which they may connect either the upper beveled gear or the lower beveled gear of the respective pairs, in driving relation with the shaft 95. In this way the tens-carrying assisting rollers 90 may be driven or not, and driven in either one direction or the other selectively from the shaft 95 to correspond with the drive and the direction of drive of their associated master wheels.

In order to shift the master wheel clutch in unison with the tens-carrying clutch for each totalizer, there is provided a shifting lever, indicated at 106, for the upper long totalizer 34, and at 107 for the lower short totalizer 35. Each of these shifting levers is pivoted at its rear end and carries a pair of pins 108, one to engage the tens-carrying clutch and the other to engage the master wheel clutch. Thus, both clutches are shifted in unison for a given totalizer, rendering the same active or silent, and when rendering a totalizer active, determining whether the carry-over roller and the master wheel shall be rotated for addition or for subtraction. Each lever extends to the front of the machine, where it is provided with a grip 110, enabling it to be easily manipulated. Just in rear of this grip, each lever engages a detent bracket 111 (Fig. 9), which is provided with three sockets 112, 113 and 114, into which the lever 106 may be sprung to retain it in the three positions of the lever and the associated clutches. Thus, the clutches will be locked in any one of their three positions, corresponding to whether the associated totalizer is adding, neutral, or subtracting.

The operation of the invention will be readily understood when taken in connection with the above description. As stated above, this case is a division of the parent application, above-mentioned, and covers a modified form, whereby vertical totalizing and cross with gross totalizing can be concomitantly carried out, using a long and a short totalizer. At the start of the initial computing line on the work-sheet, the typewriter carriage 4 is located at the extreme right of its travel; and then positioned to bring the initial computing zone or major column on the work-sheet to the printing point of the typewriting mechanism. This zone has been predetermined upon in any usual way; as, for example, by the use of properly set tabulating mechanism. To correspond with this selection of the computing zones or major columns, the pick-up stops 70 are adjusted at proper intervals along the rack bar 69.

Under such circumstances, the master wheel 53 for the short cross totalizer 35 will be in register with the initial computing wheel of this totalizer at the same time that the master wheel 52 will be in register with the first computing wheel of the first group of computing wheels corresponding to the initial computing zone. The first pick-up stop 70, that is, the one farthest to the right of Fig. 1, will be in engagement with the hook 74, forming a positive connection between the two master wheel carriages, so that they will travel in unison. As the digits are printed one by one, they are likewise run up into the computing wheels *seriatim*, the typewriter carriage 4 driving the long totalizer master wheel carriage 64, which, in turn, carries the short totalizer master wheel carriage 73 along with it.

When the final or units digit is computed in the first number for the first computing zone or major column, the short totalizer master wheel carriage 73 is disconnected from the long totalizer master wheel carriage 64 by the hook 74 running into the disengaging cam 78 as the typewriter carriage 4 jumps out of the units letter-space on the return of the numeral key striking the digit for the units place. This enables the spring drum 81 to return the short totalizer master wheel carriage 73, bringing the master wheel 53 in register with the computing wheel of highest denomination, in the short totalizer 35.

The carriage 4 is then spaced to bring the next major column or computing zone to the printing point, which will advance the two master wheels 52 and 53, skipping one or two of the highest computing wheels in the second group of the long totalizer 34 and the short totalizer 35, to allow for the carry-over from the lower computing wheels. The numeral keys are then struck in succession to concomitantly typewrite and compute the digits of the second number in the cross column, or the first number in the second vertical column. This number will be computed separately in the second group of computing wheels of the long totalizer 34 and will be added to the number already accumulated in the short totalizer 35.

The short totalizer master wheel 53 will escape as before, when the number of the second vertical column is completely written and computed, enabling the computing of the initial number in the third vertical column. This is repeated for as many vertical columns as are provided for by the pick-up stops 70, so that at the end of the first line, there will be a series of individual numbers, one for each vertical column, accumulated in the long totalizer 34, and the sum of this series accumulated in the cross totalizer 35.

For one type of work, the accumulated cross total of the first line may remain in the short totalizer 35, and the operation repeated, line by line, until, at the end, the long totalizer 34 contains a series of sums, one for each vertical column, while the cross totalizer 35 contains the gross total, including all of the numbers typewritten and computed, the short totalizer 35, however, having accumulated them in a cross total manner, while the long totalizer 34 accumulated the sums, individually, vertically. Both totalizers can then be shifted for subtracting and the sum totals in each group of computing wheels of the long totalizer copied and computed. If the work has been done correctly, the groups will be cleared to zero one by one, and the cross totalizer will be cleared to zero, forming a check on the work.

For another type of work, the last group of computing wheels of the long totalizer 34 can be reserved to transfer the accumulated cross total of the numbers vertically summed up in the remainder of the groups of computing wheels of the long totalizer 34, so that at the end of each line, the number exhibited by the cross totalizer 35 will be written on the work-sheet, thereby running it up into the last group of computing wheels of the long totalizer 34. At the same time the lever 107 of the short totalizer 35 is set for subtraction, so that the short totalizer will be cleared to zero by the act of writing the number contained therein on the work-sheet. That is to say, the short totalizer 35 will be used for each line as a cross totalizer, and cleared at the end of a line by simply making the long totalizer 34 add while the short totalizer 35 subtracts, thus exhibiting in the last group of computing wheels of the long totalizer 34 the gross total at any particular time. On the final line of the work-sheet the sums accumulated in the several groups of computing wheels of the long totalizer 34 are copied off on the work-sheet, after, first, however, shifting the lever 106 of the long totalizer 34 to subtraction. Thus, each sum will be cleared from the long totalizer 34, returning the computing wheels to zero as these vertical sums are written on the work-sheets. The short totalizer 35 is, however, at the same time adding, and will add up in a cross totalizing manner the sum of the vertical sums until the final column is reached. Then, when the final column is reached, the number exhibited by the last group of computing wheels of the long totalizer 34 should correspond to the number exhibited by the short totalizer 35. The lever 107 for the short totalizer can then be shifted to subtraction, while the lever 106 of the long totalizer 34 remains in the subtracting position, and the number, which is the gross total of item numbers written on the work-sheet, can be copied on the work-sheet, whereby it will be simultaneously cleared out of the last group of computing wheels of the long totalizer 34 and cleared out of the computing wheels of the short totalizer 35. In this way, an accurate check on the work may be had, and when a work-sheet is completed with the vertical totals, the cross totals and the gross total all computed and written on the work-sheet, all the computing wheels of both totalizers will be at zero, permitting the machine to be used for another piece of work on a new work-sheet, without need of manipulating the computing wheels.

As heretofore stated, this application is a division of my prior application, Serial No. 428,020, filed April 20, 1908, said prior application being held in the Patent Office because involved in interference. The claims of this application are limited to the modification herein disclosed, no claims being made herein which can be made in said prior application.

Variations may resorted to within the scope of the invention, and portions of the improvements may be used without others.

Having thus described my invention, I claim:

1. The combination with a totalizer having a series of computing wheels, of a master wheel traveling step by step to register individually with said computing wheels, a carriage for traversing said master wheel, a second totalizer, a master wheel for said second totalizer, a carriage for traversing said second master wheel step by step to come in register with the computing wheels of said second totalizer individually, and means for traversing said second-mentioned master-wheel carriage from said first-mentioned master-wheel carriage.

2. The combination with a long totalizer having a series of computing wheels, of a master wheel traveling relatively to said computing wheels to drive them one by one in groups to compute in several computing zones or major columns, a carriage for traversing said master wheel, a short totalizer having a plurality of computing wheels of at least the capacity of one of the groups of computing wheels of said long totalizer, a master wheel for driving the computing wheels of said short totalizer one by one, a carriage for traversing said second-mentioned master wheel, and means for intermittently traversing said second-mentioned carriage and master wheel with said first-mentioned carriage, so that said second-mentioned wheel may drive the computing wheels of said short totalizer repeatedly in separate synchronism with the computing wheels of different groups of said long totalizer.

3. The combination with a long totalizer having a series of computing wheels capable of being computed in groups to correspond with separate computing zones or major columns, of a master wheel for driving said computing wheels one by one, a carriage for traversing said master wheel step by step, a short totalizer having a plurality of computing wheels equal in number at least to the number of computing wheels in a group of said long totalizer, a master wheel for driving the computing wheels of said short totalizer one by one, a carriage for traversing said second-mentioned master wheel step by step, a hook on said second-mentioned carriage, and a plurality of pick-up stops located on said first-mentioned carriage at intervals corresponding to a predetermined grouping of the computing wheels of said long totalizer, and arranged to engage said hook one by one to traverse said second-mentioned carriage and master wheel, from said first-mentioned carriage repeatedly for short periods inclusive of the long period of travel of said first-mentioned carriage and master wheel.

4. The combination with a typewriter carriage, of a totalizer including a series of computing wheels, a master wheel for driving said computing wheels one by one, a carriage for traversing said master wheel, a rack on said typewriter carriage, a rack on said master-wheel carriage, a pinion interposed between said racks and meshing with them to enable said master wheel to be traversed concomitantly with the traveling movement of said typewriter carriage and in the opposite direction, a second totalizer having a series of computing wheels, a master wheel for driving the computing wheels of said second totalizer, a carriage for said second totalizer, and an intermittent connection made and broken at intervals during the travel of said typewriter carriage to repeatedly traverse said second-mentioned master wheel and carriage with said first-mentioned master wheel carriage and typewriter carriage during a single run of said typewriter carriage.

5. The combination with a long totalizer including a plurality of computing wheels arranged to be computed in groups for several distinct computing zones or major columns, of a master wheel for driving said computing wheels one by one, a carriage for traversing said master wheel, a short totalizer having a plurality of computing wheels equal in number to at least the number of computing wheels in a group of said long totalizer, a master wheel for driving the computing wheels of said short totalizer one by one, a carriage for traversing said second-mentioned master wheel, an automatic connection between said first and second-mentioned master-wheel carriages acting to pick up said second-mentioned carriage and traverse it along with said first-mentioned carriage for a short period and then drop it at predetermined intervals during the continued run of said first-mentioned master-wheel carriage, and a spring-motor tensioned during each advancing movement of the short totalizer master-wheel carriage acting to return said second-mentioned master-wheel carriage each time it is released, so as to cause computations in the computing wheels of said short totalizer in synchronism with successive groups of the computing wheels of said long totalizer.

6. The combination with a long series of computing wheels, of a master wheel for driving said computing wheels one by one, and capable of running up computations into said computing wheels in groups corresponding to separate computing zones, a carriage traveling to traverse said master wheel step by step, a second short series of computing wheels having a number of computing wheels equal to the number in a group of said first-mentioned computing wheels, a master wheel for driving said short series of computing wheels one by one, a second carriage for traversing said second-mentioned master wheel, and connections for driving said second carriage and master wheel from said first carriage, said connections being adjustable for varying the instant of starting to travel of said second-mentioned master wheel with said first-mentioned master wheel, so as to variably determine the grouping of said first series of computing wheels and with what group said second series of computing wheels shall coöperate, so as to compute in synchronism therewith at any particular time.

7. The combination of a paper carriage, computing mechanism having a computing wheel corresponding to each typewriter space of the paper carriage, a device adapted to pass through said computing mechanism in the opposite direction to the paper carriage and operatively connected therewith, a stationary shaft for operating said device, a tube around the shaft and arranged to move within the computing wheels, means for supporting said computing wheels independently of said tube, means located in advance of the said device and adapted to center the computing wheels relatively to the said device as the latter advances therethrough, and means for rotating said shaft by the depression of a numeral key.

8. In combination with computing mechanisms each comprising computing wheels, longitudinally moving frames of substantially the same length as said computing mechanism, stationary computing shafts, a paper carriage, a connection between said paper carriage and frames, whereby they move in opposite directions thereto, and means carried by said frames and rotatable with the computing shafts for actuating said computing wheels in succession as the frames move.

9. In combination with computing mechanisms each comprising computing wheels, longitudinally moving frames of substantially the same length as said computing mechanisms, stationary computing shafts, a paper carriage, connections between said paper carriage and said frames, whereby they move in opposite directions thereto, said connections including means whereby the motion of the second frame is intermittently actuated from the movement of the first frame, and means carried by said frames and rotatable with the computing shafts for actuating said computing wheels in succession as the frames move.

10. In combination with computing mechanisms each comprising computing wheels, longitudinally moving frames of substantially the same length as said computing mechanisms, stationary computing shafts, a paper carriage, connections between said paper carriage and said frames, whereby they move in opposite directions thereto, said connections including means whereby the motion of the second frame is intermittently actuated from the movement of the first frame, means whereby the extent of actuation is varied as desired, and means carried by said frames, and rotatable with the computing shafts for actuating said computing wheels in succession as the frames move.

11. The combination of a paper carriage, two computing mechanisms, each comprising stationary computing devices and a movable actuator, means whereby one of said actuators is moved by the paper carriage in the opposite direction, and an operative connection whereby the other actuator is intermittently moved by said paper carriage in the opposite direction.

12. The combination of a paper carriage, stationary computing mechanism, a movable actuator therefor, an element moved by the paper carriage in the opposite direction thereto, and a connector for automatically connecting said actuator to said element, at predetermined points in the path of said element.

13. In an apparatus of the character described, the combination of main and secondary computing mechanisms, each comprising computing devices, an actuator for each computing mechanism, means for operating said actuators in unison, means for producing an advance of the main actuator to engage in succession its computing devices, means for producing a plurality of advances of the secondary actuator to engage its computing devices during the advance of the main actuator, and means for varying the extent of each advance of the secondary actuator.

14. In an apparatus of the character described, the combination of main and secondary computing mechanisms, each comprising computing devices, an actuator for each computing mechanism, means for operating said actuators in unison, means for producing an advance of the main actuator to engage in succession its computing devices, means for producing a plurality of advances of the secondary actuator to engage its computing devices during one complete advance of the main actuator, and means for varying the extent of each advance of the secondary actuator.

15. In an apparatus of the character described, the combination of main and secondary computing mechanisms, each comprising computing devices, all computatively connected in a continuous series, an actuator for each computing mechanism, means for operating said actuators in unison, means for producing an advance of the main actuator to engage in succession its computing devices, means for producing a plurality of advances of the secondary actuator to engage its computing devices during one complete advance of the main actuator, and means for varying the extent of each advance of the secondary actuator.

16. In an apparatus of the character described, the combination of main and secondary computing mechanisms, each comprising a continuous series of computing devices, an actuator for each computing mechanism, means for operating said actuators in unison, means for producing an advance of the main actuator to engage in succession its computing devices, means for connecting the secondary actuator with the main actuator to cause them to advance in unison, means for varying the distances through which the main actuator has advanced when such connections are successively made, means for automatically causing the return of the secondary actuator when it has completed its advance, and means for variably arresting said secondary actuator on its return to cause it to engage at the time of its arrest any computing device of its mechanism.

17. In combination with a typewriter having a frame, main and secondary computing mechanisms, each comprising computing devices, an actuator for each, means whereby they may be operated in unison, means whereby the secondary actuator may be caused to travel as a unit with the first to repeatedly engage in successive computing devices of its mechanism, means for removing said engaging means at a uniform point in each relative advance of the secondary actuator, means for producing a reverse relative movement of the actuator, and variable means for varying the extent of each reverse movement.

18. In combination with a typewriter having a frame, main and secondary computing mechanisms each comprising computing devices, an actuator for each, means whereby they may be operated in unison, means whereby the secondary actuator may be caused to travel as a unit with the first to engage in succession computing devices of its mechanism, a common device fixed on the frame disengaging them at a predetermined point in the relative path of the secondary actuator, means for producing a reverse relative movement of the actuator, and variable means for varying the extent of each reverse movement.

19. In an apparatus of the character described, the combination of main and secondary computing mechanisms, each comprising computing devices, all computatively connected in a continuous series, an actuator for each computing mechanism, means for operating said actuators in unison, means for producing an advance of the main actuator to engage in succession its computing devices, and means for producing a plurality of advances of the secondary actuator to engage its computing devices during one complete advance of the main actuator through its series of computing devices.

20. In an apparatus of the character described, the combination of main and secondary computing mechanisms, each comprising computing devices, an actuator for each, means for operating said actuators in unison, the main computing devices being arranged to be actuated by their actuator in a plurality of independent yet operatively connected groups, means for moving the main actuator across its computing devices, means for producing a movement of the secondary actuator, relative to its computing devices, with each movement of the main actuator, relative to each independent group in succession of its computing devices, and means for producing a reverse relative movement of the secondary actuator between its successive movements made in unison with the first actuator.

21. In an apparatus of the character described, the combination of main and secondary computing mechanisms, each consisting in a series of computing devices, an actuator for each computing mechanism, means whereby said actuators are operated in unison, the computing devices of the main mechanism being capable of being variably grouped to form independent columns variably located, means for producing a movement of the main actuator to cause it to engage in succession computing devices of the several groups of the main mechanism, and means for producing from the portional relative movements of the main actuator repeated relative movements of the secondary actuator to cause it at each such movement to engage in succession computing devices of the secondary mechanism.

22. In an apparatus of the character described, the combination of main and secondary computing mechanisms, each consisting of a series of computing devices, an actuator for each computing mechanism, means whereby said actuators are operated in unison, the computing devices of the secondary mechanism forming a single group, and the computing devices of the main mechanism being capable of being variably grouped to form independent columns variably located, means for producing a movement of the main actuator to cause it to engage in succession computing devices of the several groups of the main mechanism, and means for producing from the portional relative movements of the main actuator repeated relative movements of the secondary actuator to cause it at each such movement to engage in succession computing devices of the secondary mechanism.

23. In an apparatus of the character described, the combination of main and secondary computing mechanisms, each comprising a continuous series of computing devices, an actuator for each computing mechanism, means for operating said actuators in unison, means for producing an advance of the main actuator to engage in succession its computing devices, means for repeatedly connecting the secondary actuator with the main actuator to cause them to advance in unison, means for automatically causing the return of the secondary actuator when it has completed its advance, and means for variably arresting said secondary actuator on its return to cause it to engage at the time of its arrest any computing device of its mechanism.

24. In an apparatus of the character described, the combination of main and secondary computing mechanisms, each consisting of a series of computing devices, an actuator for each computing mechanism, means whereby said actuators are operated in unison, all the computing devices from beginning to end of the main mechanism being spaced in groups of three, each group corresponding to four typewriter spaces, means for producing a movement of the main actuator to cause it to engage in succession the computing devices of the several groups of the computing devices of the main mechanism, and means for producing, from portional movements of the main actuator relative to the main mechanism, repeated movements of the secondary actuator relative to the secondary mechanism to cause it at each such movement to engage in succession computing devices of the secondary mechanism.

25. The combination with groups of primary computing wheels and a single primary master wheel therefor adapted to travel in procession across them, of a group of gross computing wheels, a gross master wheel, means for effecting a relative resetting movement between the gross master wheel and the gross computing wheels every time that the primary master wheel proceeds from one group of primary computing wheels to the succeeding group, and means constantly connecting the gross master wheel to the primary master wheel, the gross computing device being caused to either add or subtract, whereby any of the respective amounts written in the primary columns may be either added or subtracted by the gross computing device at the will of the operator.

26. In an apparatus of the character described, the combination of main and secondary computing mechanisms, each consisting of a series of computing devices, an actuator for each computing mechanism, means whereby said actuators are operated in unison, means whereby a transfer can be made from any computing device of the entire series to the next device on the left, means for moving the main actuator to cause it to engage in succession the computing devices of the several groups of the main mechanism, and means for producing, from portional movements of the main actuator relative to the main mechanism, repeated movements of the secondary actuator relative to the secondary mechanism to cause it at each such movement to engage in succession computing devices of the secondary mechanism.

27. In a combined typewriting and computing machine, the combination with a traveling carriage, of a plurality of master wheels adapted to travel in a direction opposite to said carriage, means for causing one master wheel to travel continuously with the carriage, and means for causing the other master wheel to travel intermittently with the carriage.

28. In a combined typewriting and computing machine, the combination with a traveling master wheel adapted to travel with the carriage but in an opposite direction, of a second master wheel, and means whereby the second master wheel travels intermittently with the first master wheel and in the same direction.

29. In a combined typewriting and computing machine, the combination with a traveling typewriter carriage, of a master wheel carriage, a gear intermediate said carriages for causing them to travel together in opposite directions, a second master wheel carriage, and means for intermittently connecting the master wheel carriages for causing them to travel together.

30. The combination with a traveling typewriter carriage, of a fixed totalizer comprising computing wheels, a master wheel adapted to travel within said wheels to turn them, a carriage for said master wheel, a rail upon which said master wheel carriage runs, a rack upon said typewriter carriage, a rack upon the master wheel carriage, a gear between said racks to cause the carriages to travel in opposite directions, a bar forming part of said master wheel carriage, a second computing carriage, and devices settable on said bar to cause the second computing carriage to travel with the master wheel carriage intermittently.

WALTER WRIGHT.

Witnesses:
ARTHUR A. JOHNSON,
JENNIE P. THORNE.